March 13, 1962  J. H. ANDRESEN, JR  3,025,494
TAKE-OFF INDICATOR FOR AIRCRAFT
Filed Jan. 24, 1958  3 Sheets-Sheet 1

INVENTOR.
JOHN H. ANRESEN, JR.

BY
ATTORNEYS

March 13, 1962 　　J. H. ANDRESEN, JR　　3,025,494
TAKE-OFF INDICATOR FOR AIRCRAFT
Filed Jan. 24, 1958　　　　　　　　　　　3 Sheets-Sheet 2

INVENTOR.
JOHN H. ANDRESEN, JR.
BY
ATTORNEYS

March 13, 1962   J. H. ANDRESEN, JR   3,025,494
TAKE-OFF INDICATOR FOR AIRCRAFT
Filed Jan. 24, 1958   3 Sheets-Sheet 3
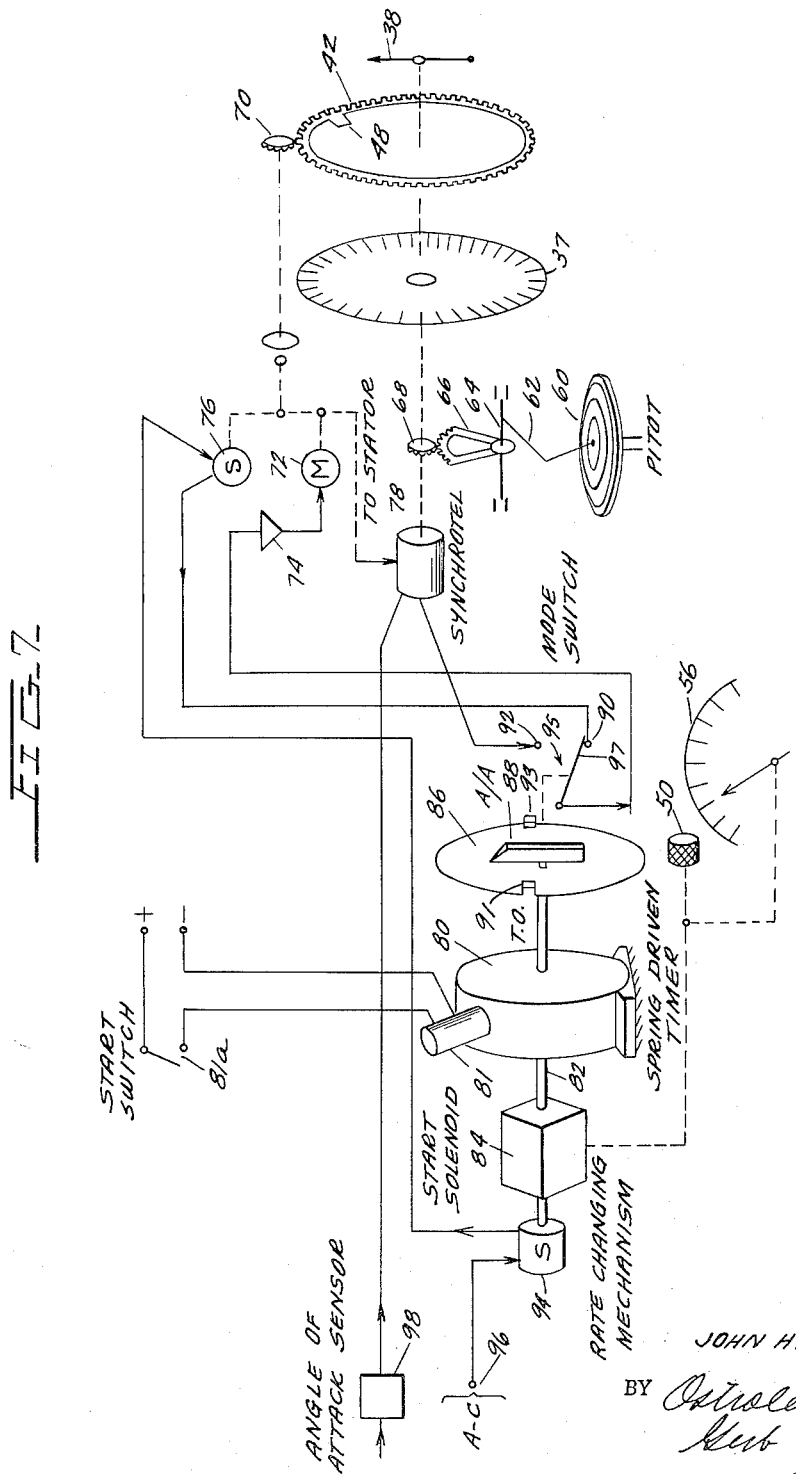
INVENTOR.
JOHN H. ANDRESEN, JR.
BY
ATTORNEYS

United States Patent Office 3,025,494
Patented Mar. 13, 1962

3,025,494
TAKE-OFF INDICATOR FOR AIRCRAFT
John H. Andresen, Jr., Greenwood Lake, N.Y., assignor to Kollsman Instrument Corporation, Elmhurst, N.Y., a corporation of New York
Filed Jan. 24, 1958, Ser. No. 710,918
12 Claims. (Cl. 340—27)

This invention relates to a take-off indicator for aircraft which affords a continuous indication to the pilot of required airspeed at any point along the take-off run for the plane to reach take-off speed at a predetermined point, and more specifically relates to a take-off indicator in which the theoretical required airspeed at any point along the runway to achieve subsequent take-off speed is determined by a self-contained timing mechanism which is operable in conjunction with the airspeed indicator, independently of any other of the aircraft mechanism such as the aircraft wheels.

Aircraft and particularly aircraft which are jet powered require a means by which the pilot will know at any time during the take-off run whether or not his rate of increase of indicated airspeed and the value of airspeed are such as to permit the aircraft to reach the critical take-off airspeed within the allowable runway length. Unless an indicator of this type is used, the progress of the take-off run is left more completely to the judgment of the pilot.

However, such variables as wind, air density, condition of runway, gross weight, characteristics of the aircraft and possible loss of thrust must be taken into consideration in deciding in sufficient time whether to complete the take-off or to abort.

While systems which are connected to the wheels of an aircraft have been suggested for this purpose wherein the distance consumed in the runway length may be determined and indicating means are driven through a cammed mechanism to show the required instantaneous velocity at any point along the runway, this type of system adds relatively complex mechanical components to the aircraft wheels.

The essence of the instant invention is to provide means for indicating the required theoretical speed at any instant during the take-off run which, if extrapolated according to empirically determined airplane characteristics, would result in correct take-off speed being reached a safe distance before the end of the runway from a means which is self-contained and independent of other aircraft mechanism, such as wheels or thrust meters and accelerometers.

When applied to jet powered aircraft, the rate of acceleration is relatively constant, so the time actuated mechanism may drive a first member at a predetermined rate through a simple mechanism and compare its progress to the pointer of the aircraft's airspeed indicator. If the comparison is unsatisfactory, a warning signal may be actuated.

Thus, in the instant invention, a timing mechanism drives the take-off indication as a function of time and compares it with indicated airspeed. This is in contrast to above noted systems wherein a measured distance is used as an input for the take-off indicator and compared to ground speed. By using time as the measured parameter, it is clear that a self-contained timing mechanism may be utilized wherein the timing mechanism will cause the take-off indicator to be driven from zero velocity to a theoretical take-off airspeed within a time and on an empirically derived schedule which is determined by the various take-off conditions.

The timing mechanism will preferably be adjustable so that variations of these various conditions may be taken into account by causing the theoretically required speed indicator to be driven at different and varying rates. Furthermore, the timing mechanism may take many self-contained forms such as a clock mechanism or a motor which gives a certain mechanical output such as its number of rotations, as a function of time.

Accordingly, the primary object of this invention is to provide a novel aircraft take-off indicator.

Another object of this invention is to provide a novel take-off indicator in which the parameter driving the take-off indicator which is compared to airspeed is derived from a self-contained timing mechanism.

Another object of this invention is to provide a novel take-off indicator which is independent of external aircraft mechanism.

Another object of this invention is to provide a novel take-off indicator, driven from an adjustable timing mechanism, which offers an indication of required airspeed at any point along a runway in order to reach take-off speed at a specified distance from the end of the runway.

In addition to providing a novel take-off indicator mechanism, the invention also provides a novel method of presenting this information to the pilot. As may be seen in application, Serial No. 811,507, filed May 6, 1959, and directed to a novel integrated flight instrument system, a unitary meter is provided for presenting each of indicated airspeed, maximum permissible speed, and angle of attack.

More specifically, this instrument provides a first pointer which indicates airspeed, a second pointer which indicates maximum permissible airspeed and a third circumferential indicator which is positioned relative to the airspeed pointer from an angle of attack sensor and has marked thereon indications of approach and stall angles of attack.

The pilots of the aircraft are therefore trained to closely observe the airspeed readings of this instrument particularly during take-off when airspeed is critical. Therefore, the instant invention proposes to apply the novel theoretical take-off speed signal to the angle of attack circumferential indicator whereby the pilot may, by continuing to observe the same instrument which he would normally observe, have a well presented comparison between his actual airspeed and the required instantaneous airspeed for reaching critical take-off speed throughout the length of the take-off run.

During normal operation of the angle of attack indicator, the mechanism is driven through a servo system which is energized from an angle of attack sensor. In the instant invention a switching means is provided whereby energization of the servo system is disconnected from the angle of attack sensor and is connected to the timing mechanism, whereby the indicator is driven by this timing mechanism and through the same servo system during take-off. Thus, the circumferential indicator will be driven to indicate the theoretical instantaneous velocity determined by the timing mechanism, and this can be easily compared to the measured aircraft speed indicated by the aircraft speed pointer on the same dial.

If desired, additional or alternative mechanism could be provided whereby a single indicating pointer is driven by the differential between the measured aircraft velocity (or acceleration) and the calculated aircraft velocity (or acceleration) as determined from a self-contained timing mechanism whereby the pilot would watch only the single comparator indicator to know whether he is above or below some instantaneous critical speed (or acceleration) along any point of the runway.

Accordingly, a still further object of this invention is to present required take-off speed information on the same indicator which indicates the speed of the aircraft.

Still another object of this invention is to adapt an airspeed indicator having other indicating mechanisms thereon whereby one of the other indicating mechanisms will be driven from the timing mechanism for determining instantaneous take-off speeds during take-off conditions and will be thereafter returned to its normal indicating function.

These and other objects of this invention will become apparent from the following description when taken in connection with the drawings, in which:

FIGURE 7 is a schematic line diagram of one embodiment of this novel invention wherein a spring driven timing device operates in conjunction with an instrument which indicates indicated airspeed as well as angle of attack.

Figure 1:
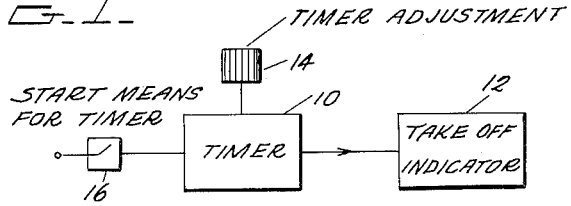
FIGURE 1 shows a block diagram of the novel take-off indicator driven from a self-contained timing device.

Referring now to FIGURE 1 which shows a block diagram of the essence of the instant invention, a timing device 10 is combined with a take-off indicator device 12 so as to cause the take-off indicating device to be driven at a rate which is determined by the timer 10. The rate at which timer 10 drives may be adjusted by a timer adjustment means 14 and the timer may be started by the starting means schematically indicated at block 16.

As has been previously described, this novel take-off indicator will drive a "required speed" indicator at rates corresponding to a computed airspeed schedule required in order to reach a take-off velocity within an allowable runway length. Thus, by comparison with an actual airspeed indicator, a pilot will always have before him an indication of whether or not he is accelerating sufficiently to achieve a subsequent take-off, or whether his instantaneous velocity anywhere along the runway is below a calculated velocity for that point, so that the required velocity at the end of the runway will not be reached. Therefore, he may abort the takeoff at the point where the velocity is measured as being too low to subsequently reach the required take-off velocity.

A simplified relationship between the minimum aircraft acceleration at any point along the runway may be shown to be given by:

$$b_{min} = \frac{1}{2S}\sqrt{\frac{P_0}{T_0}}\sqrt{\frac{T}{p}}(K\sqrt{W}-W_{hi})^2$$

where $b_{min}$ is the rate of change of indicated airspeed required for take-off,
S is the allowable runway length,
$p_0$ is the standard air pressure,
$T_0$ is standard air temperature,
T is existing air temperature,
p is existing air pressure,
K is a constant of proportionality,
W is the gross weight of the aircraft,
$W_{hi}$ is the indicated headwind component.

It should be noted that this relation is given for jet powered aircraft and it is assumed that the thrust and, therefore, the acceleration of the aircraft will be constant over the length of runway.

Accordingly, the indicated airspeed as a function of time will be linear. Thus, from the above noted relation it is possible to construct a simple timer mechanism to drive a take-off speed indicator wherein the instantaneous theoretical take-off speed at any point along the runway must be at least below the actual aircraft speed, if the subsequent minimum take-off speed is to be reached at the end of the runway.

It is to be noted that a different relation and correspondingly different time actuated mechanism which delivers a function of acceleration non-linearly with respect to time could be provided for aircraft which do not have a constant thrust so that acceleration is variable with time. It will further be obvious to those skilled in the art that corrections for deviations from the above noted relationship for other aircraft may be easily approximated by using a simple cam in the timer rate changing means. However, for purpose of simplicity, only aircraft having a constant acceleration shall be discussed herein, and the adaption of the novel invention to aircraft having non-constant acceleration will be obvious to those skilled in the art.

In the operation of the system of FIGURE 1 it will now be apparent that the pressure, temperature, aircraft weight and wind speed components may be easily determined and the required rate of change of indicated airspeed be calculated from the above relation to determine how the timer adjustment 14 is to be set. That is to say, the above calculation will determine how fast the timer mechanism is to be driven to cause the indicating pointer to reach the critical take-off velocity within the limits of the runway.

Since this novel timing device is a self-contained unit and independent of external aircraft mechanism, it is desirable to prevent a false initiation of the timer mechanism prior to the beginning of the take-off run. Several interlocking means may be provided to assure initiation of the timer 10 only when the aircraft is ready to take-off.

Figure 2:
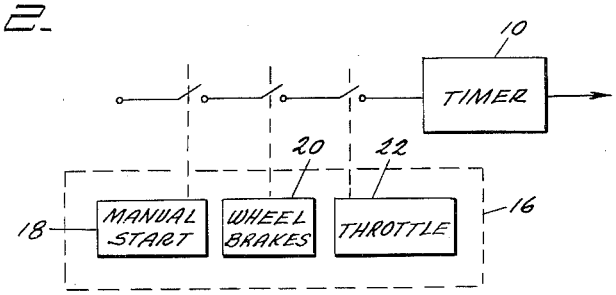
FIGURE 2 is a block diagram of the starting means for initiating operation of the timer of FIGURE 1.

By way of example, FIGURE 2 shows the timer mechanism 10 as being associated with the start means 16 of FIGURE 1, now shown as a dotted box, which will permit operation of timer 10 responsive to three independent conditions.

The first of these conditions is the operation of a manual start means 18 by the pilot or co-pilot; the second condition is the release of the wheel brakes as indicated by wheel brake means 20; and the third condition is the opening of the engine throttles by engine throttle means 22.

Thus, when the aircraft is preparing to take off the pilot may actuate means 18. Only when the wheel brakes are released to actuate means 20 and the throttle is opened to actuate means 22 does the timer 10 begin operation.

It will be obvious that each of the three systems may not be necessary to initiate operation of the timer. Thus, the only required operation in a given embodiment may be the operation of the manual start means 18 by the pilot. Conversely, the pilot may be relieved of this function by causing operation of timer 10 only responsive to the release of wheel brakes and opening of the throttle which cause operation of the components 20 and 22.

In general, however, any of the above interlocks individually or in any combination could be applicable in initiating timer operation.

Figure 3:
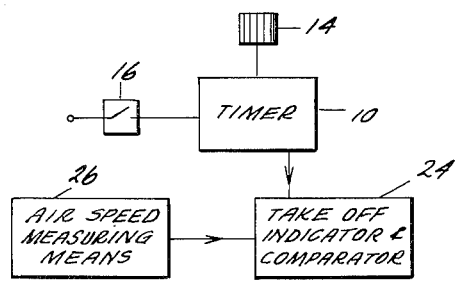
FIGURE 3 is a block diagram of the manner in which the novel indicator system of FIGURE 1 may be operated in conjunction with an airspeed measuring device so that the theoretical required speed may be continuously compared to the measured airspeed during the take-off run.

The block diagram of FIGURE 3 indicates a further feature of this invention wherein the take-off indicator operated from timer 10 is incorporated in a unitary instrument 24 which also has a measured airspeed indication impressed thereon from the airspeed measuring device 26. This type of structure will have the advantage of easy comparison between the indicated airspeed as measured in an airspeed diaphragm, and the calculated speed required for subsequently reaching take-off speed. Thus, the pilot can easily see whether his indicated speed is above or below this theoretical speed and can promptly decide whether to complete the take-off or abort.

Such instruments wherein both a first and second phenomena are indicated on a unitary dial face are well known in the art and their mechanism will not be further described for the case of FIGURE 3.

Figure 4:
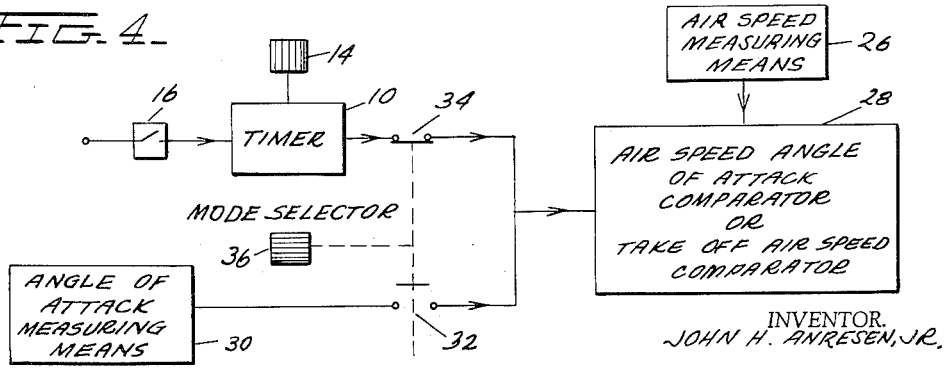
FIGURE 4 is a block diagram of the system of FIGURE 3 in an instrument which also presents an indication of angle of attack wherein the angle of attack system may be switched off during take-off conditions and the take-off timing mechanism may control the angle of attack indicator to indicate take-off required velocity.

A further embodiment of this novel invention is set forth in FIGURE 4 which is similar to FIGURE 3, but sets forth a unitary indicating instrument which presents both an angle of attack indication and the indicated airspeed indication. In the case of FIGURE 4, the indicating device is shown as device 28 which has the airspeed measuring device 26 connected thereto, and the angle of attack measuring means 30 and timer means 10 are alternately connectable to indicator 28 through the switching means 32 and 34 respectively, which are operated from a mode selector 36.

Figure 5:
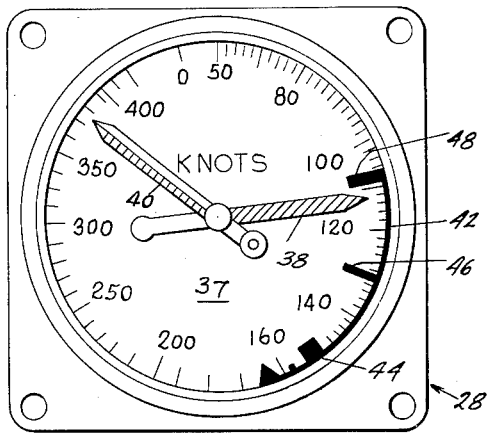
FIGURE 5 is a front view of an indicating instrument of the type used in the diagram of FIGURE 4 for presenting indicated airspeed, maximum airspeed, angle of attack or theoretical take-off speed.

The presentation of information given by instrument 28 is more specifically understood from FIGURE 5 which shows the dial face and indicating means of such an instrument. More specifically, FIGURE 5 shows indicating instrument 28 as comprising a dial face 37 having airspeed calibrated in knots from 50 knots to 400 knots. Pointer 38 sweeps around dial face 37 and is operated from an indicated airspeed measuring device so that pointer 38 points to the indicated aircraft speed. In the case of FIGURE 5 the indicated airspeed is at approximately 112 knots.

A second pointer 40 is mounted co-axially with respect to pointer 38, this pointer being driven by an altitude diaphragm and presenting maximum speed for the aircraft at that particular altitude. Thus, in the indication of FIGURE 5 the maximum speed that the aircraft should fly would be 375 knots.

A third indicator is provided in the device 28, this being the circumferentially mounted indicator 42. This indicator is circumferentially driven by mechanism to be described hereinafter and is positioned relative to the air speed pointer responsive to angle of attack of the aircraft. From this angle of attack indication, phenomena such as approach speed and stall speed may be derived. Accordingly, the angle of attack indicator 42 has a first indicated marker 44 for indicating approach angle of attack and a second indicating marker 46 for indicating stall angle of attack.

As will be set forth more fully hereinafter, indicator 42 is normally driven through a servo system actuated by the angle of attack sensor. In accordance with the instant invention, however, the servo system can be disconnected from the angle of attack sensor, and connected to be driven from the novel timer mechanism whereby a third marker 48 positioned on indicator 42 will indicate theoretical take-off airspeed.

Returning now to FIGURE 4, it is seen that when the angle of attack measuring means 30 controls the position of indicator 42 of instrument 28, the switch 32 must be closed and the switch 34 opened by means of the mode selector 36 which selects the angle of attack indicating mode.

When the mode selector is operated, it will disconnect the angle of attack measuring mode by opening means 32 and connect the take-off indicator mode by closing means 34 to connect the output of timer 10 to drive the indicator 42 in a manner to be hereinafter described.

Accordingly, the aircraft pilot who is accustomed to observing indicator 28 during take-off conditions will now have a readily available indication of the comparison between the indicated airspeed by way of pointer 38 and the theoretical airspeed that should be attained at that point by way of marker 48 of indicator 42.

It is to be noted that in the condition illustrated in FIGURE 5 the theoretical take-off airspeed is at 108 knots, while the indicated airspeed or actual airspeed in at 112 knots. Therefore, the pilot knows that he can proceed and that if conditions continue he will reach take-off speed in time to get safely off the runway.

Clearly, once the aircraft takes off successfully, the mode selector 36 of FIGURE 4 may be operated either automatically or manually to disconnect the timer mechanism by disconnecting means 34, and re-energize indicator 42 of FIGURE 5 from the angle of attack measuring means 30 of FIGURE 4 by closing means 32.

If desired, the mode selector 36 may be advantageously combined with the timer rate adjustment means 14 in a single instrument. Such an adjusting instrument is set forth in FIGURE 6 which shows the dial face of the instrument as comprising a rate adjusting knob 50 having a first rotatable pointer 52 and a second rotatable pointer 54. Pointer 52 cooperates with a rate scale 56, while pointer 54 cooperates with a mode selector scale 58. By forcibly moving knob equipped pointer 54 to take-off position the spring timing mechanism is wound up and ready to start at signal from switch means 16. The timer winds down during take-off run at the end of which it automatically actuates the mode selector switches 32 and 34 of FIGURE 4. In operation prior to take-off the pilot will calculate or will be told at which rate his timer 10 should be driven in accordance with the various take-off conditions as indicated in the equation set forth above. This rate may be set in by moving indicator 52 to the appropriate acceleration figure. This will, in turn, adjust the rate at which timer mechanism 10 is driven to reach the take-off velocity within a time corresponding to the time that the aircraft should be at the safe distance from the end of the runway.

It is to be noted that timer mechanism 10 may be of any type of mechanism, such as a clock which can be operated at an adjustable rate. By way of example, the mechanism could be of the type set forth in U.S. Patent No. 2,503,154 to H. C. Graves, Jr., although it could be of any form so long as it will yield an output which is a function of time.

Once the aircraft has successfully taken off it is now desirable to have an indication of angle of attack. As the timer mechanism unwinds clockwise it will cause a mechanism such as the contacting mechanism 32 and 34 of FIGURE 4 to reconnect the angle of attack measuring means 30 and disconnect the timer means 10 through internal mechanism (not shown) which may be of any desired type presently commercially available. Alternatively, a separate manual switch may be used to do this.

A partially schematic diagram of the system of FIGURE 4 is set forth in the embodiment of FIGURE 7, and particularly illustrates how this novel time actuated take-off indicator may be combined to drive an indicating device alternately with an angle of attack measuring means.

More specifically, FIGURE 7 partially shows the indicating dial 37 of FIGURE 5 in an exploded view with the circumferential indicating means 42 being more completely shown as comprising a gear member which is co-axially mounted with respect to dial 37 in any desired manner.

The circumferential dial 42 is further shown as having only the marker 48 for take-off speed indication as protruding therefrom in order to simplify the diagram. Furthermore, only the indicated airspeed pointer 38 is shown in FIGURE 7 as being co-axially and pivotally mounted with respect to dial 37.

Indicated airspeed pointer 38 is positioned in the conventional manner in accordance with the airspeed measurement by Pitot-static diaphragm means 60 which, in conjunction with an operating linkage 62, rotates pivotally mounted shaft 64 which rigidly supports sector gear 66. Sector gear 66 then co-acts with a cooperating gear 68 on the schematically indicated shaft which supports pointer 38. Thus, the pointer 38 will be positioned with respect to dial 37 by the airspeed measured by means 60. At the same time the rotor of Synchrotel 78 is positioned by the shaft supporting pointer 38 relative to the instrument frame.

Indicating means 42 is also rotatably mounted with respect to dial face 37 and is rotated by means of a cooperating gear 70 which is driven from the output of motor 72 of the servo system including amplifier 74, servo rotor 76 and its cooperating stator 78.

The novel take-off timer mechanism is schematically set forth in FIGURE 7 as including a mechanical timer mechanism 80 which may be spring operated, and is self-contained. Timer mechanism 80 is associated with a starting solenoid 81 which may normally latch the timer mechanism when in the de-energized condition and remove the timer latch when energized to initiate operation of the timer. This internal latching mechanism may be of any desired type well known in the art and is not shown herein.

The energization of starting solenoid 81 may be accomplished through a switching arrangement of the type set forth in FIGURE 2 wherein energization of switching means operable from the wheel brakes, the throttle and a manual start means is required. However, in FIGURE 7 energization of starting solenoid 81 is shown as being taken through a single starting switch 81a which connects a voltage source in series with the solenoid when the switch is manually depressed.

The spring driven timer 80 is so constructed as to drive a shaft 82 at some pre-set angular rate when the starting solenoid 81 unlatches the timer mechanism. To control the rate of rotation, shaft 82 further carries a rate adjusting mechanism 84 which could, if desired, be an integral part of the timing mechanism 80.

Figure 6:
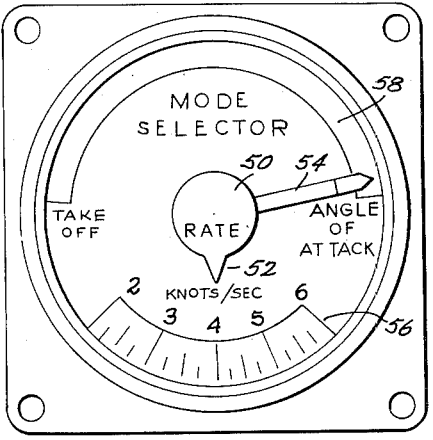
FIGURE 6 is a front view of a timer mechanism and mode selector means for switching from angle of attack indications to take-off indication in the instrument of FIGURE 5.

In the case of FIGURE 7, the rate changing mechanism 84 is, as was set forth in FIGURE 6, controlled from rate adjusting means 50 which is mechanically interconnected, as indicated by the dotted lines, to the rate changing mechanism 84 with the rate of change being indicated on scale 56.

If desired, the output of rate changing mechanism may be taken through a cam means to correct the output time function for applications having thrust characteristics which are not constant.

Shaft 82 further mounts disk 86 which may be part of the mode selector of FIGURE 6, and carries thereon a movable arm 88 which is rotatable with pointer 54 and moves between stops 91 and 93.

FIGURE 7 shows a microswitch 95 positioned adjacent stop 93 and adapted to be operated by arm 88 when arm 88 reached its clockwise rotational limit. As schematically indicated by dotted lines, the microswitch 95 has stationary contacts 90 and 92 and cooperating movable contact 97 associated therewith where movable contact 97 is operable responsive to engagement of arm 88 and the operating means of microswitch 95. This operation will be described more fully hereinafter.

Shaft 82 is further connected to a synchro-device 94 which is energized from an A.-C. source at terminal 96 and delivers a signal in accordance with the angle of rotation of shaft 82 to synchro 76.

The manner in which circumferential indicator 42 is operated from either the angle of attack sensor or the take-off indicator is as follows, first considering the operation from the angle of attack sensor:

An angle of attack sensor containing a synchro output means indicated schematically at numeral 98 cooperating with the synchrotel 78 measures the angle of attack of the aircraft and positions indicator 42 relative to the airspeed pointer in accordance with the stall or approach angle of the aircraft. During angle of attack, measuring conditions arm 88 is connected to microswitch 95 whereby contact arm 97 engages contact 92 so that the angle of attack signal from sensor 98 is modified by synchrotel 78 and fed through contact arm 97, amplifier 74, and motor 72. So long as error signal exists between synchro 98 and synchrotel 78, motor 72 will be rotated to position stator of synchrotel 78 and scale 42 until this signal is brought to zero. Accordingly, the stall or approach angle of attack indication is adjusted with respect to pointer 38.

In order to now operate indicator 42 as a take-off indicator, arm 88 is rotated counter-clockwise and disengages microswitch 95 so that contact arm 97 moves into engagement with contact 90. At the same time shaft 82 is rotated counter-clockwise, this action operating to wind up the spring of timer 80, if this timer is spring driven. Through signals from synchros 94 and 76, the servo positions marker 48 to a position corresponding to zero airspeed.

Alternatively, the marker could be started at a position corresponding to the headwind component of airspeed and the calculation for required rate modified accordingly. For this purpose, extra indicia may be provided on the mode selector dial near the "take-off" mark which is calibrated in terms of headwind component for a given position of the rate knob. The rate at which shaft 82 hence the number 48, is to be driven is then determined from the particular take-off conditions at hand, this rate being set on knob 50 of FIGURES 6 and 7 in conjunction with required acceleration indicated on scale 56 to reach take-off speed at the end of the runway.

When the pilot is ready to begin the take-off, the start switch 81a of FIGURE 7 is closed to cause starting solenoid 81 to unlatch the timing mechanism. This will initiate the rotation of shaft 82 by means of spring driven timer 80 at a rate which is adjustably determined by mechanism 84. Since shaft 82 drives the synchro 94, the conventional servo consisting of synchros 94 and 76 plus amplifier 74 and motor 72, turns gear 70 and hence ring 42 and number 48 to a position corresponding to those of timer shaft 82.

Accordingly, it is seen that circumferential scale 42 will be rotated at a rate which is given by the rate of rotation of synchro 94 which, in turn, is driven from the spring driven timer 80. This rate of change of the indication afforded by pointer 48 of indicator 42 may be controlled through positive speed changing mechanism 84 by means of knob 50 which controls the rate of rotation of shaft 82. Clearly, the pilot may easily monitor his actual aircraft speed with respect to the desired speed given by the pointer 48 and may, therefore, at any instant know whether the take-off should be completed or aborted.

If the application of this novel system is to a non-constant thrust device, then a cam mechanism can be inserted between the rate control means 84 and synchro 94, to alter the time output function according to any desired speed schedule.

It should be noted that warning signal means could readily be applied, for example by a contact means associated with pointer 38 and marker 48 to give a visual or audible warning signal if the pointer 38 gets ahead of marker 48, thus indicating that the aircraft will not achieve take-off speed at the desired place on the runway.

Figure 8:
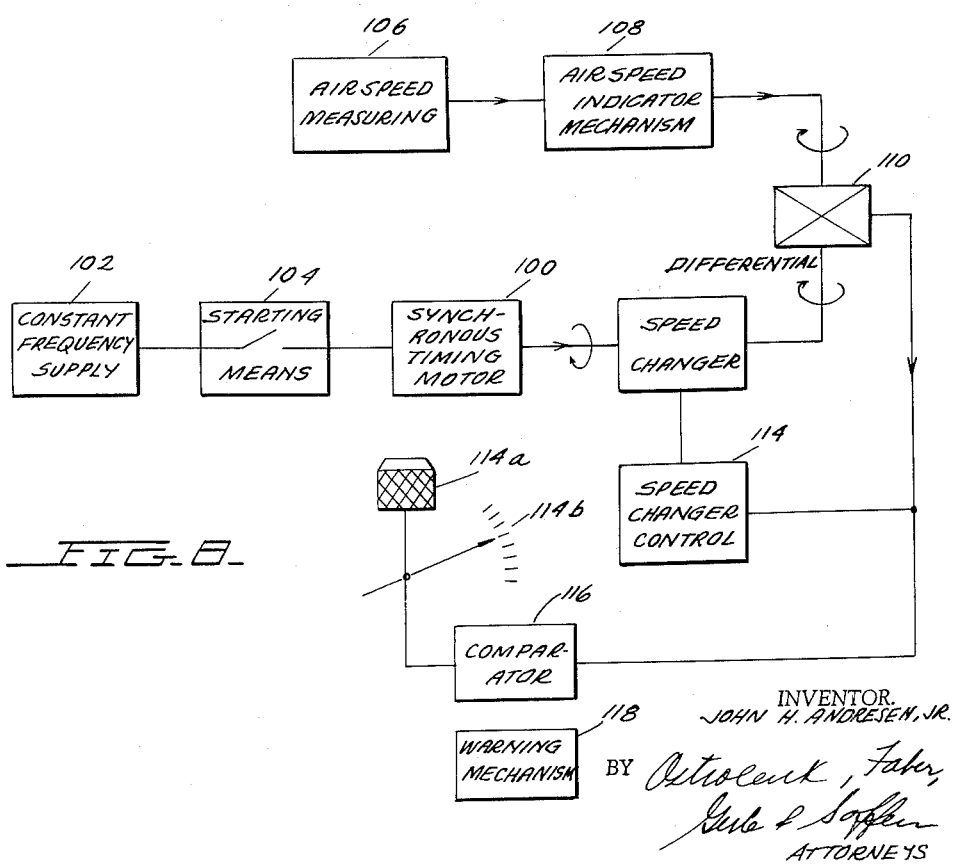
FIGURE 8 is a block diagram of this novel invention wherein the input time parameter is derived from a synchronous motor, and the actual aircraft acceleration and required aircraft acceleration during take-off conditions are compared by a single indicator.

In the embodiment of FIGURE 8, the time function is derived from a synchronous motor 100 which is energized from a constant frequency supply 102 responsive to the operation of starting means 104. More specifically, while in the case of FIGURE 7, the time function for driving a take-off indicator was taken from a clock type of mechanism which is spring operated, FIGURE 8 derives a time function from the angular rotation of a synchronous motor 100.

As further seen in FIGURE 8, an airspeed measuring device 106, which could be any type of indicated airspeed sensor attached to the aircraft, measures the actual aircraft speed and delivers this speed to a servo mechanism 108 which reproduces at a high torque and at a remote location the position of the airspeed sensing element. This rotation from mechanism 108 is delivered to one side of a differential 110, while the constant rotation of synchronous motor 100 is delivered to the other side of differential 110 through a speed changer means 112. Speed changer means 112, which could be a cone-ball-cylinder type of speed changer is controlled by a speed changer control means 114 which, in the case of a cone-ball cylinder changer, would be the means for moving the ball with respect to the cone, and the speed changer control means 114 is controlled from the output of differential 110.

Accordingly, when the rotational outputs of mechanism 108 and 112 to differential 110 are different, the differential 110 will have an output which is applied to speed changer control means 114 which, in turn, will control the rotational speed of speed changer 112 to bring the difference in rotational speed between speed changer 112 and mechanism 108 to zero.

Accordingly, the speed changer control means 114 will be positioned in accordance with the actual acceleration of the aircraft as compared to some calculated acceleration set by knob 114a on scale 114b. If the acceleration measured by position of control 114 is below that computed and set in by knob 114a and scale 114b and compared in comparator 116, then the warning mechanism (such as a dial or light or horn) will indicate the take-off should be aborted.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A take-off indicator for aircraft; said take-off indicator including an indicating means and a driving means; said indicating means transmitting to aircraft personnel information functionally related to required aircraft indicated airspeed for said aircraft to subsequently reach a predetermined take-off speed for predetermined conditions; said driving means being operatively connected to said indicating means; said driving means being a self-contained timing mechanism operating independently of the runway distance consumed by said aircraft; said driving means driving said indicating means as a function of elapse of time.

2. A take-off indicator for aircraft; said take-off indicator including an indicating means and a driving means; said indicating means transmitting information functionally related to required aircraft indicated airspeed to aircraft personnel for said aircraft to subsequently reach a predetermined take-off indicated airspeed for predetermined conditions; said driving means being operatively connected to said indicating means; said driving means being a self-contained timing mechanism operating independently of the runway distance consumed by said aircraft; said driving means driving said indicating means as a function of elapse of time; said driving means including a spring operated clock type mechanism for delivering said function of elapse of time.

3. A take-off indicator for aircraft having a substantially constant thrust during take-off conditions; said take-off indicator including an indicator means, a driving means and a comparator means; said indicator means and said comparator means presenting the required instantaneous aircraft speed for said aircraft to subsequently reach a predetermined take-off speed under predetermined conditions and actual instantaneous aircraft speed respectively whereby said required instantaneous speed is comparable to actual instantaneous speed; said driving means being connected to said take-off indicator for driving said take-off indicator means; said driving means being a self-contained unit operated as a function of elapse of time and independently of the actual take-off distance traversed by said aircraft.

4. A take-off indicator for aircraft; said take-off indicator including an indicator means, a driving means and a comparator means; said indicator means and said comparator means presenting the required instantaneous aircraft speed for said aircraft to subsequently reach a predetermined take-off speed under predetermined conditions and actual instantaneous aircraft speed respectively whereby said required instantaneous speed is comparable to actual instantaneous speed; said driving means being connected to said take-off indicator for driving said take-off indicator means; said driving means being a self-contained unit operated as a function of elapse of time and independently of the actual take-off distance traversed by said aircraft.

5. A take-off indicator for aircraft having a substantially constant thrust during take-off conditions; said take-off indicator including an indicator means, a driving means and a comparator means; said indicator means and said comparator means presenting the required instantaneous aircraft indicated airspeed for said aircraft to subsequently reach a predetermined take-off speed under predetermined conditions and actual instantaneous aircraft speed respectively whereby said required instantaneous airspeed is comparable to actual instantaneous airspeed; said driving means being connected to said take-off indicator for driving said take-off indicator means; said driving means being a self-contained unit operated as a function of elapse of time and independently of the actual take-off distance traversed by said aircraft; said driving means including a spring operated clock type mechanism for delivering said function of time.

6. A take-off indicator for aircraft having a substantially constant thrust during take-off conditions; said take-off indicator including an indicator means, a driving means and a comparator means; said indicator means and said comparator means presenting the required instantaneous aircraft indicated airspeed for said aircraft to subsequently reach a predetermined take-off airspeed under predetermined conditions and actual instantaneous aircraft speed respectively whereby said required instantaneous airspeed is comparable to actual instantaneous airspeed; said driving means being connected to said take-off indicator for driving said take-off indicator means; said driving means being a self-contained unit operated as a function of elapse of time and independently of the actual take-off distance traversed by said aircraft; said driving means being adjustable to deliver said function of time at a predetermined rate.

7. A take-off indicator for aircraft having a substantially constant thrust during take-off conditions; said take-off indicator including an indicator means, a driving means and a comparator means; said indicator means and said comparator means presenting the required instantaneous aircraft indicated airspeed for said aircraft to subsequently reach a predetermined take-off airspeed under predetermined conditions and actual instantaneous aircraft speed respectively whereby said required instantaneous airspeed is comparable to actual instantaneous airspeed; said driving means being connected to said take-off indicator for driving said take-off indicator means; said driving means being a self-contained unit operated as a function of elapse of time and independently of the actual take-off distance traversed by said aircraft; said driving means including a spring operated clock type mechanism for delivering said function of elapse of time; said driving means being adjustable to deliver said function of elapse of time in an adjustable predetermined manner.

8. A take-off indicator for aircraft; said take-off indicator including an indicating means and a driving means; said indicating means transmitting information functionally related to required aircraft indicated airspeed to aircraft personnel for said aircraft to subsequently reach a predetermined take-off airspeed for predetermined conditions; said driving means being operatively connected to said indicating means; said driving means being a self-contained timing mechanism operating independently of the runway distance consumed by said aircraft; said driving means driving said indicating means as a function of elapse of time; said driving means being adjustable to deliver said function of elapse of time at a predetermined rate; a starting means for initiating operation of said driving means; said starting means being operated to initiate driving substantially simultaneously with the initiation of the take-off of said aircraft.

9. A take-off indicator for aircraft; said take-off indicator including an indicating means and a driving means; said indicating means transmitting information functionally related to required aircraft indicated airspeed to aircraft personnel for said aircraft to subsequently reach a predetermined take-off airspeed for predetermined conditions; said driving means being operatively connected to said indicating means; said driving means driving said indicating means as a function of elapse of time; a starting means for initiating operation of said driving means; said starting means being operated to initiate driving substantially simultaneously with the initiation of the take-off of said aircraft; said starting means including a manually operable switching means operable by aircraft personnel.

10. A take-off indicator for aircraft having a substantially constant thrust during take-off conditions; said take-off indicator including an indicator means, a driving means and a comparator means; said indicator means and said comparator means presenting the required instantaneous indicated airspeed for said aircraft to subsequently reach a predetermined take-off speed under predetermined conditions and actual instantaneous aircraft speed respectively whereby said required instantaneous speed is comparable to actual instantaneous speed; said driving means being connected to said take-off indicator for driving said take-off indicator means; said driving means being a self-contained unit operated as a function of elapse of time and independently of the actual take-off distance traversed by said aircraft; a starting means for initiating operation of said driving means; said starting means being operated to initiate driving substantially simultaneously with the initiation of the take-off of said aircraft.

11. A take-off indicator for aircraft having a substantially constant thrust during take-off conditions; said take-off indicator including an indicator means, a driving means and a comparator means; said indicator means and said comparator means presenting the required instantaneous indicated airspeed for said aircraft to subsequently reach a predetermined take-off airspeed under predetermined conditions and actual instantaneous aircraft speed respectively whereby said required instantaneous airspeed is comparable to actual instantaneous speed; said driving means being connected to said take-off indicator for driving said take-off indicator means; said driving means being a self-contained unit operated as a function of elapse of time and independently of the actual take-off distance traversed by said aircraft; said driving means being adjustable to deliver said function of elapse of time in an adjustable predetermined manner; a starting means for initiating operation of said driving means; said starting means being operated to initiate driving substantially simultaneously with the initiation of the take-off of said aircraft.

12. A take-off indicator for aircraft having a substantially constant thrust during take-off conditions; said take-off indicator including an indicator means, a driving means and a comparator means; said indicator means and said comparator means presenting the required instantaneous indicated airspeed for said aircraft to subsequently reach a predetermined take-off air speed under predetermined conditions and actual instantaneous aircraft speed respectively whereby said required instantaneous speed is comparable to actual instantaneous airspeed; said driving means being connected to said take-off indicator for driving said take-off indicator means; said driving means being a self-contained unit operated as a function of elapse of time and independently of the actual take-off distance traversed by said aircraft; said driving means being adjustable to deliver said function of elapse of time in an adjustable predetermined manner; a starting means for initiating operation of said driving means; said starting means being operated to initiate driving substantially simultaneously with the initiation of the take-off of said aircraft; and starting means including a manually operable switching means operable by aircraft personnel.

References Cited in the file of this patent

UNITED STATES PATENTS

| | | |
|---|---|---|
| 2,660,977 | Gordon | Dec. 1, 1953 |
| 2,665,860 | Bancroft | Jan. 12, 1954 |

FOREIGN PATENTS

| | | |
|---|---|---|
| 471,690 | Canada | Feb. 10, 1951 |